United States Patent [19]

Yorks et al.

[11] Patent Number: 5,479,164
[45] Date of Patent: Dec. 26, 1995

[54] PHOTONIC DATA COMPRESSION SYSTEM AND METHOD

[76] Inventors: Jason Yorks, 409 Boynton Ave., San Jose, Calif. 95117; Ben Yorks, 2037 Cherokee, Tustin, Calif. 92680

[21] Appl. No.: 238,677

[22] Filed: May 5, 1994

[51] Int. Cl.⁶ ................................................. H03M 7/30
[52] U.S. Cl. ........................................ 341/50; 250/568
[58] Field of Search .......................... 341/50, 155, 144; 359/15; 385/8, 24, 49; 250/568

[56] References Cited

U.S. PATENT DOCUMENTS

| | | |
|---|---|---|
| 3,572,881 | 3/1971 | Nishida . |
| 3,719,409 | 3/1973 | Vincelette . |
| 3,770,336 | 11/1973 | Roess . |
| 3,985,975 | 10/1976 | Steensma . |
| 4,062,618 | 12/1977 | Steensma . |
| 4,223,216 | 9/1980 | Quick et al. . |
| 4,764,889 | 8/1988 | Hinton et al. . |
| 4,907,848 | 3/1990 | Pavlath . |
| 4,941,733 | 7/1990 | Leib . |
| 4,988,153 | 1/1991 | Paek . |
| 5,004,309 | 4/1991 | Caulfield et al. . |
| 5,016,009 | 5/1991 | Whiting et al. . |
| 5,016,966 | 5/1991 | Bowen et al. . |
| 5,040,864 | 8/1991 | Hong . |
| 5,056,039 | 10/1991 | Caulfield . |
| 5,071,232 | 12/1991 | Kato et al. . |
| 5,121,231 | 6/1992 | Jenkins et al. . |
| 5,129,041 | 7/1992 | Pernick et al. . |
| 5,136,666 | 8/1992 | Anderson et al. ............... 385/24 |
| 5,216,529 | 6/1993 | Paek et al. . |
| 5,359,686 | 10/1994 | Galloway et al. ............... 385/49 |

OTHER PUBLICATIONS

Mok, Fai H., "Angle-Multiplexed Storage of 5000 Holograms in Lithium Niobate", Optics Letters, vol. 18, No. 11, Jun. 1, 1993, pp. 915–917.

Rosen, Joseph, "Wavelength-Multiplexed Computer-Generated Volume Holography", Optics Letter, vol. 18, No. 9, May 1, 1993, pp. 744–746.

Tao, S., et al, "Spatioangular Multiplexed Storage of 750 Holograms in a FE:LINBO₃ Crystal", Optics Letters, vol. 18, No. 11, Jun. 1, 1993, pp. 912–914.

*Primary Examiner*—Brian K. Young
*Attorney, Agent, or Firm*—Blakely, Sokoloff, Taylor & Zafman

[57] ABSTRACT

A photonic system for compressing and decompressing data using a hologram that converts a plurality of spatially modulated light beams into a single reference beam that has a wavelength unique to a bit string of data. The single reference beam is then converted into a plurality of spatially modulated light beams by a diffraction grating. The light beams are detected by a bank of photodetectors which convert the photonic energy into electrical signals that correspond to the originally transmitted bit string.

9 Claims, 5 Drawing Sheets

| CONTENTS OF BIT STRING | WAVELENGTH OF REFERENCE BEAM |
| :---: | :---: |
| 0000 | 0 |
| 0001 | $\lambda_1$ |
| 0010 | $\lambda_2$ |
| 0011 | $\lambda_3$ |
| 0100 | $\lambda_4$ |
| 0101 | $\lambda_5$ |
| 0110 | $\lambda_6$ |
| 0111 | $\lambda_7$ |
| 1000 | $\lambda_8$ |
| 1001 | $\lambda_9$ |
| 1010 | $\lambda_{10}$ |
| 1011 | $\lambda_{11}$ |
| 1100 | $\lambda_{12}$ |
| 1101 | $\lambda_{13}$ |
| 1110 | $\lambda_{14}$ |
| 1111 | $\lambda_{15}$ |

FIG. 4

PHOTONIC DATA COMPRESSION SYSTEM AND METHOD

BACKGROUND OF THE INVENTION

1. Field of the Invention

The present invention relates to a photonic system that compresses and decompresses data.

2. Description of Related Art

Electronic systems process and transfer information that is defined by binary bit strings. For Example, under the American Standards Committee Information Interchange (ASCII) code the letter "a" is defined by the binary bit string "10000001". Binary bit strings are used to define information because electronic devices operate with transistors which have one of two states, high or low.

Binary information is typically stored within a storage device in a serial format. For example, hard disk drives contain a magnetic head which magnetizes or senses the magnetic field of a rotating magnetic disk. Each magnetized area represents a single bit of data. To write data, the head will magnetize areas of the rotating disk in accordance with a series of clock signals. Each clock signal corresponds to a time period required to store a single bit. Therefore it typically takes 8 clock cycles to write an 8 bit string. Optical disk drives operate in a similar manner, wherein a light beam is directed toward a rotating disk which has areas that are either reflective or non-reflective. A reflective area may represent a binary 1 and a non-reflective area may represent a binary 0, or visa versa. The light beam is then detected by a detector and converted into corresponding digital electrical signals. The detectors convert the light energy into electrical signals in accordance with a series of clock signals.

Electronic information is transmitted between two or more devices in accordance with a predetermined protocol. For example, digital information is commonly transmitted between electronic devices separated by large distances using facsimile (FAX) or (MODEM) protocols. Computers linked together within a network typically transmit data using a conventional network protocol such as Ethernet. Present conventional transmission protocols require a serial transfer of information between serial ports of the devices. Like the heads of a disk drive, the serial ports of electronic devices transmit and receive each bit of information in accordance with a clock signal. Generally speaking, it requires at least 8 clock signals to transfer 8 bits of information.

To reduce the transmission time of transferring data, various data compression techniques have been employed. Present data compression methods typically reduce the size of the bit string to a smaller number of bits which can then be decoded back to the original bit string. Examples of conventional transmission data compression techniques include run length encoding, Huffman coding and quadrature amplitude modulation.

There are also data compression methods for storing information. For example, U.S. Pat. No. 5,003,307 issued to Whiting et al. discloses a method for compressing data that is stored on a hard disk, thereby increasing the data capacity of the disk drive. Although these methods are effective in compressing data, present data compression techniques all require electronic devices to perform the various steps of compression. Electronic devices consume power which can be critical to small systems such as a laptop computer. The operation of steps needed to compress the data may require a relatively large number of clock cycles which may increase the time to transfer or store the data. Additionally, some data compression techniques such as quadrature amplitude modulation have limited compression ratios.

Optical based systems such as fiber optic networks are used when high speed transmission is desired. Likewise, optical storage devices are becoming increasingly popular because of the durability of the disk. To date, data compression techniques used in optical systems still require electronic devices in compress and decompress the data. It would be desirable to have an optical data compression system and method, that is faster, consumes less power and can provide higher compression ratios than compression techniques in the prior art.

SUMMARY OF THE INVENTION

The present invention is a photonic system for compressing and decompressing data. The photonic system includes a bank of light emitters that convert electrical signals into a plurality of light beams that define a spatially modulated light beam. The spatially modulated light beam corresponds to a bit string of digital data. Each bit string will result in a different spatially modulated light beam. The spatially modulated light beam is directed toward a hologram which constructively combines the spatially modulated light beam into a single reference light beam. Each bit string and corresponding spatially modulated light beam will create a reference light beam with a different wavelength. The single reference light beam is transmitted through an optical cable guide to a refraction element which refracts the reference beam. The refracted reference beam is directed to a diffraction grating that creates a spatially modulated light beam that is defined by a plurality of light beams. The number and spatial relationship of the light beams is dependent upon the wavelength of the reference beam. The spatially modulated light beam is detected by a bank of photodetectors which convert the light beams back into electrical signals. The electrical signals correspond to the same bit string that was provided to the light emitters.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 4 is a table showing the wavelengths of the transmitted reference beam that correlate to bit strings encoded by the hologram;

DETAILED DESCRIPTION OF THE INVENTION

Figure 1:
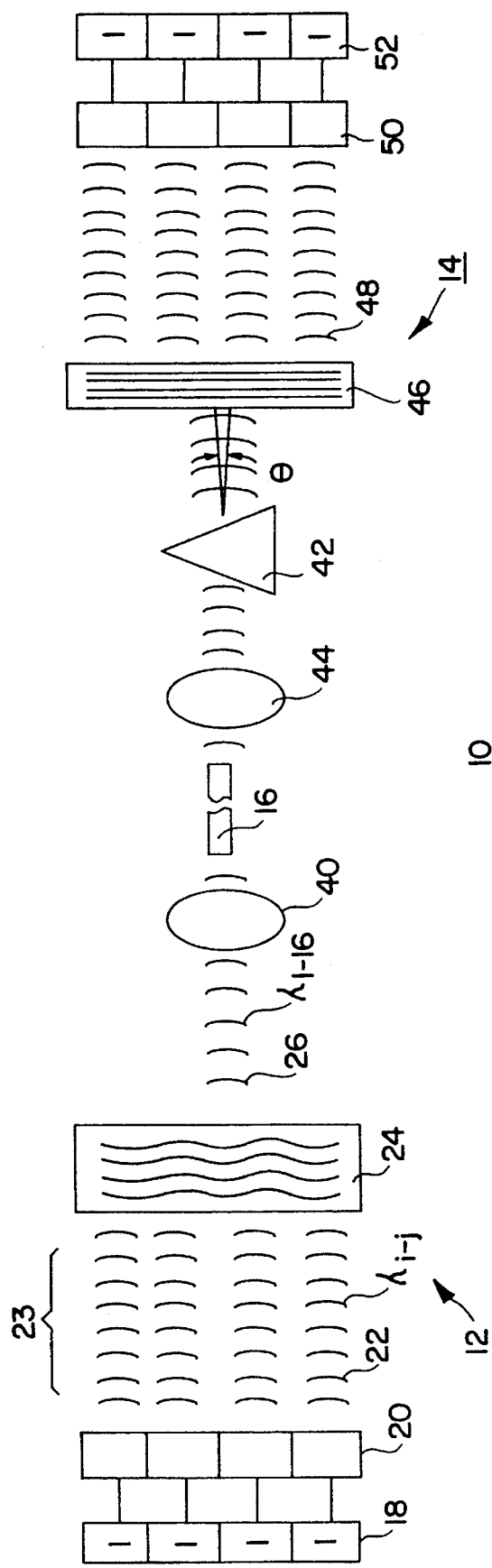
FIG. 1 is a schematic of a photonic system of the present invention.

Referring to the drawings more particularly by reference numbers, FIG. 1 shows a photonic system 10 of the present invention. The photonic system 10 has an encoding subsystem 12 that is coupled to a decoding subsystem 14 by an optic cable guide 16. The encoding subsystem 12 is coupled to a plurality of output registers 18. The registers 18 may be part of an information transceiver such as a local area network (LAN) interface card which transfers electronic information between devices linked to the network. Each register 18 contains a bit that may be part of a data bit string.

Each output register 18 is connected to a corresponding light source 20 such as a light emitting diode (LED). The contents of the registers 18 are latched into the LEDs 20 which generate corresponding light beams 22. The register contents are typically loaded into the LEDs as a set, although it is to be understood that any number of registers 18 can be latched into the LEDs 20. The LEDs 20 are physically separated so that the individual light beams 22 together define a spatially modulated light beam 23. Each LED 20 can actually be a number of LEDs combined to generate a light beam having a plurality of wavelength components. Alternatively, each light source 20 may be a single diode that generates a light beam having a band of wavelengths.

Figure 2B:
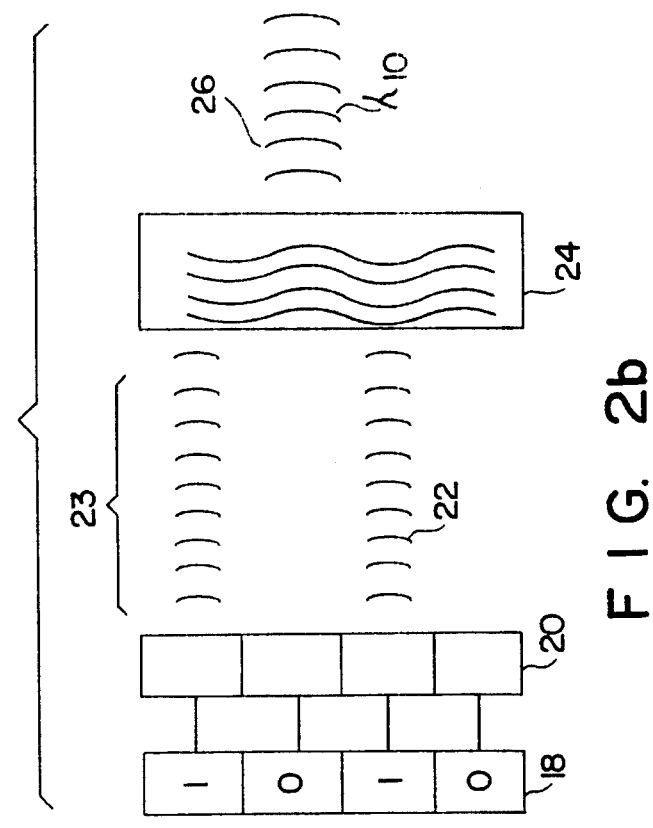
FIG. 2b is a schematic showing another spatially modulated light beam.
Figure 2A:
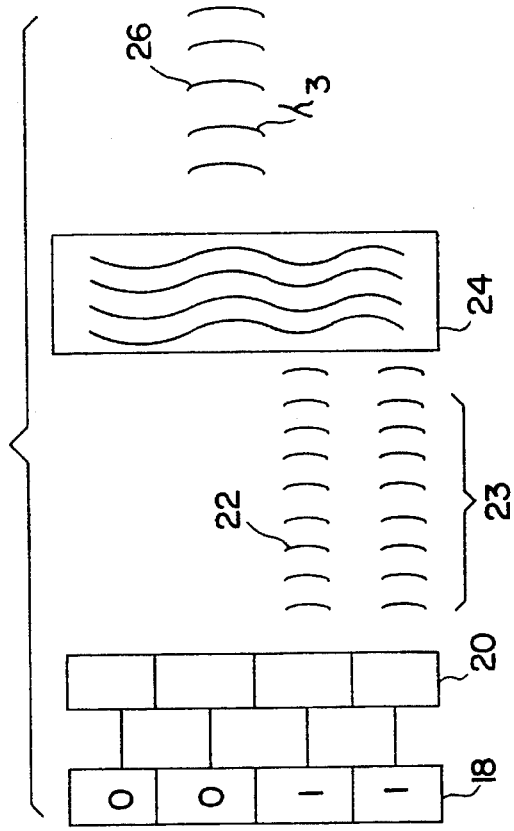
FIG. 2a is a schematic showing a spatially modulated light beam.

The spatially modulated light beam 22 is directed to a hologram 24. The hologram 24 has an interference grating that reconstructs the light beam 22 into a single reference beam of light 26. The reference beam 26 has a wavelength that is unique to the spatially modulated light beam 22 generated by the LEDs 20. Each different bit string in the registers 18 will result in a corresponding spatially modulated light beam 22 that has a unique number of beams 22 and a unique spatial relationship between the beams 22. For example, the bit string 0011 will create a spatially modulated light beam that contains the adjacent individual light beams shown in FIG. 2a. The spatially modulated light beam 22 will be reconstructed by the hologram 24 into a reference beam 26 with a wavelength $\lambda_3$. As shown in FIG. 2b, a bit string 1010 will be encoded by the hologram 24 to create a single reference beam with a different wavelength $\lambda_{10}$.

Figure 3B:
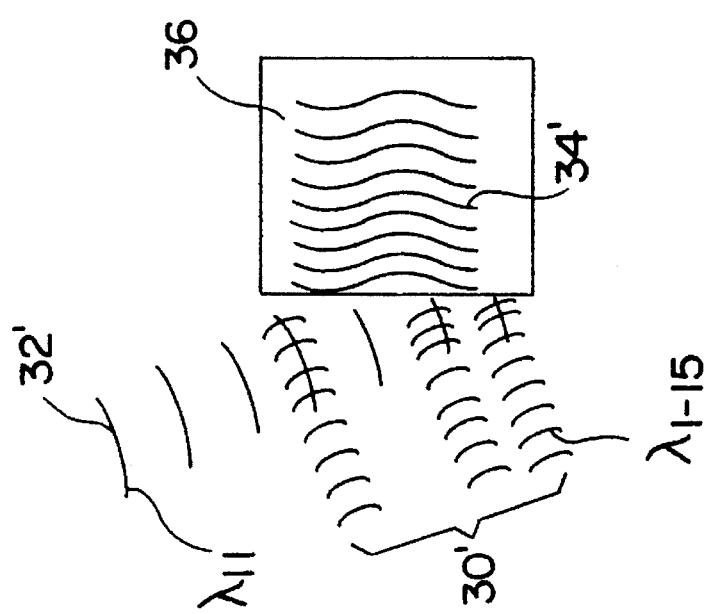
FIG. 3b is a schematic similar to FIG. 3a showing another unique set of object and reference beams being encoded onto the hologram.
Figure 3A:
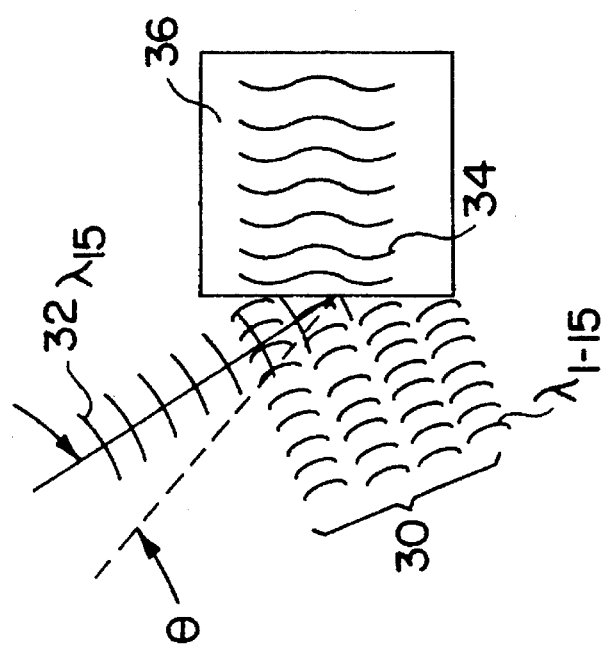
FIG. 3a is a schematic showing the construction of a hologram of the system.

As shown in FIGS. 3a and 3b, the hologram 24 is initially constructed by directing a spatially modulated object beam 30 and a reference beam 32 onto a photosensitive material 34. The object beam 30 corresponds to the spatially modulated light beam 23 generated by the LEDs 20. The reference beam 32 is a single beam which has a unique ranging between 1–15. As shown in FIG. 3a, the spatially modulated object beam 30 and the reference beam 32 interfere to create an irradiance pattern 34 on the photosensitive material 36. As shown in FIG. 3b, after the first irradiance pattern is created, a second set of object 30' and reference 32' beams are directed toward the material 36. The second object beam 30' is different than the first spatially modulated light beam 30. Likewise, the second reference beam 32' has a wavelength that is different than the wavelength of the first reference beam 32. The second set of object 30' and reference 32' beams create a second irradiance pattern 34'. The process of directing a unique set of object and reference beams onto the photosensitive material is repeated until the material is fully encoded. The angle φ of the reference beam 32 may also be varied for each set of object and reference beams.

As shown in FIG. 4, for a system with 4 output registers 18, 16 states including 15 different reference beams, each with a different wavelength, would be required to encode the bit strings. Therefore, 15 different sets of object and reference beams would be separately directed toward the photosensitive material. The photosensitive material is then developed into a hologram 24. The hologram 24 can be either transmissive or reflective. Although a system with 4 registers 18 is shown, it is to be understood that more registers 18 may be incorporated and more irradiance patterns may be formed in the photosensitive material 36. For example, the system 10 may contain 8 registers that are encoded by a hologram 24 that creates a single reference beam 26 and so forth and so on. For large compression ratios, a volume hologram may be used to three-dimensionally store a number of irradiance patterns. The encoded holograms may be encoded with the techniques disclosed in the publications, J. Rosen et al, "*Wavelength Multiplex Computer-Generated Volume Holography*", Optics Letters, Vol. 18, pp. 744–46, May 1, 1993; F. Mok, "*Angle-Multiplexed Storage of 500 Holograms in Lithium Niobate*", Optics Letters, Vol. 18, pp. 915–17, Jun. 1, 1993 and S. Tao, et al, "*Spatioangular Multiplexed Storage of 750 Holograms in a FE:LiNBO₃ Crystal*", Optics Letters, Vol. 18, pp. 912–14, Jun. 1, 1993, which are hereby incorporated by reference. For relatively low compression ratios, a diffraction grating(s) can be used instead of the hologram 26.

Referring to FIG. 1, the reference beam 26 is preferably focused into the optic cable 16 by a first lens 40. The reference beam 26 travels down the cable 16 and is focused into a refraction medium 42 by a second lens 44. The reference beam 26 exits the refraction medium 42 at an angle θ. Reference beams 26 of different wavelengths will exit the refraction medium 42 at different angles θ. From the refraction medium 42 the reference beam 26 is directed into a diffraction grating 46. The reference beam 26 is diffracted by the diffraction grating 46 into a spatially modulated light beam 48 that is defined by a plurality of individual light beam. The spatially modulated light beam 48 is detected by photodetectors 50, which convert the photonic energy into electrical signals. The electrical signals can be stored within input registers 52. As an alternate embodiment, the diffraction grating 46 can be replaced with a hologram 24 constructed in the manner shown in FIGS. 3a and 3b, wherein a plurality of irradiance patterns are encoded by separate sets of object and reference beams.

In operation, a bit string is loaded into the registers. By way of example, the bit string may be 1111. The bit string is converted into a spatially modulated light beam 22 that is reconstructed by the hologram 24 into a single reference beam 26 which has a wavelength $\lambda_{15}$. The reference beam 26 travels down the optic cable 16 and is refracted to the diffraction grating 46 by the refraction medium 44. The diffraction grating diffracts the single reference beam 26 into a spatially modulated light beam 48. The light beam 48 is detected by the photodetectors 50 and stored in the registers 52 as bit string 1111. The system thus encodes a bit string into a single light beam which is then decoded back into the bit string. Although compression of a 4 bit data stream is shown and described, it is to be understood that other compression ratios can be utilized. For example, a byte of data could be compressed, wherein the hologram 24 would create reference beams having one of $\lambda_{1-255}$ wavelengths.

Compressing data with light has many advantages, the most obvious being that the compression is occurring at the speed of light which is much faster than electronic based compression devices of the prior art. Additionally, the optic compression scheme of the present invention does not require the numerous clocking cycles that are typically required to compress data with conventional electronic devices. Compressing the data optically during transmission also reduces some of the synchronization problems normally associated with transmitting data. For example, devices that are optically linked within a local area network typically transmit data in accordance with a protocol commonly referred to as 4B/5B code. A 4B/5B encoder converts 4 bit data groups to 5 bit symbols which are then transmitted serially bit by bit. The 5 bit symbols never have more than two consecutive 0s to insure synchronization. By compressing the 4 bit data group into one signal, the present invention eliminates the occurrence of consecutive signals and the possibility of more than two consecutive 0s. The present invention may therefore eliminate the need for a 4B/5B encoder, including the additional power and clock cycles required to encode the bit string, along with the added transmission time needed to transmit the extra bit.

Figure 5:
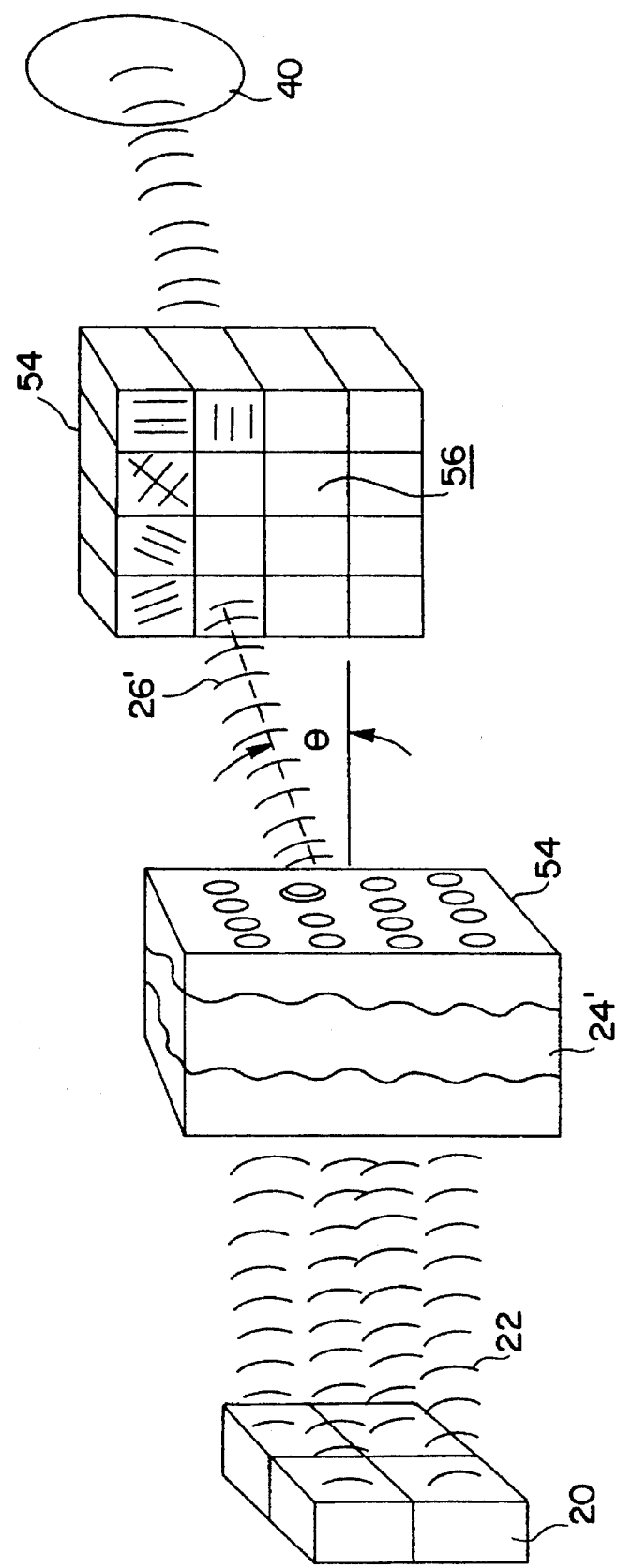
FIG. 5 is a schematic of an alternate embodiment of the photonic system shown in FIG. 1.

FIG. 5 shows an alternate embodiment of the photonic system wherein the spatially modulated light beam 22 generated by the LEDs 20 is reconstructed by the hologram 24' into a single reference beam 26' that exits the hologram 24' at an angle $\phi$, wherein the angle $\phi$ varies for each unique spatially modulated light beam 22. The reference beam 26' has a plurality of wavelength components. The reference beam 26' is directed to an optical filter 54 which has a plurality of spatially separated segments 56. Each segment 56 absorbs all but a unique wavelength or band of wavelengths of light. The resulting reference beam that exits the filter 54 has a unique wavelength(s). For example, the bit string 0100 may result in a single light beam 22 that is constructed into a single reference beam 26' that exits the hologram 24' at an angle $\phi_5$. The reference beam strikes the 5th segment 56 of the filter 54 which absorbs all light wavelengths except $\lambda_4$. Referring to FIG. 1, the reference beam 26' is then guided by the optic cable to the diffraction grating 46 where the reference beam 26' is diffracted into a spatially modulated light beam that is stored in the input registers 52 as bit string 0100. The hologram 26' is constructed in the same manner as described and shown in FIGS. 3a and 3b, except the angle of the reference beam 32 is varied instead of varying the wavelength of the reference beam for each set of object and reference beams. Varying the angle of the reference beam will create irradiance patterns in the hologram that will create a reconstructed reference beam that has a unique exit angle $\phi$ dependent upon the number and spatial relationship of the light beams generated by the LEDs. The back surface of the hologram 26' can be coated with an optically absorbing material that absorbs all wavelengths of light. The absorbing material may be coated in a manner to create apertures 54 that allow the reference beam 26' to transmit therethrough and are located at the different exit angles $\phi$ of each reference beam $\lambda_{1-15}$. The optical coating may eliminate "noise" created by the hologram. The optical coating can also be used on the system shown in FIG. 1 when the reference beam is also angularly multiplexed.

Although transmission of data within a local area network has been shown and described, it is to be understood that the optical compression system of the present invention can be used in other applications such as the transmission of data on a public switched telephone network (PSTN) which utilizes optic cables. Additionally, the present photonic system can be used in an optic disk drive. As discussed in the background of U.S. Pat. No. 5,056,079 issued to Chung, a disk can be encoded with spatial-frequency memory areas that emit light beams which have varying wavelengths. The disk is constructed from a photochemical material with wavelength dependent absorption. When a light beam having a unique wavelength is directed onto the disk, the molecules of the disk medium undergo a transformation which prevents the material from again absorbing that wavelength of light. The disk is encoded by changing the wavelength of the light and writing information on the disk.

The present invention can utilize a photochemical medium such as that discussed in the '079 patent to write and subsequently read compressed data on a rotating optical disk. The disk as an element essentially replaces the optic guide 16. The disk can be encoded by the LEDs 20 and hologram 24 which create a single reference beam 26 with a unique wavelength. When directed at the disk, the disk material undergoes a transformation so that the wavelength of light will never again be absorbed. Each area of the disk is encoded with a unique wavelength of light.

The encoded disk is then placed in a disk drive which directs a beam of light at the disk. The light beam has a plurality of wavelength components. Each area of the disk will reflect a light beam that has a unique wavelength. The light beam is decoded by the refraction medium, diffraction grating and photodetectors described and shown in the decoding system 14 of FIG. 1. For example, within a disk sector, the first data bit of the disk may emit a light beam with a wavelength of $\lambda_{12}$ which is decoded into the bit string 1100. The second data bit of the sector may be a light beam with a wavelength $\lambda_2$ which is decoded into the bit string 0010, and so forth and so on. The present invention could be used on various optical disk devices, including disk units commonly referred to as CD-ROM.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those, ordinarily skilled in the art.

What is claimed is:

1. A photonic system for compressing a data bit string which has a plurality of data bits, comprising:

a light source that generates a first spatially modulated light beam which has a spatial address that corresponds to the data bits of the data bit string, said first spatially modulated light beam has a plurality of wavelengths;

a refractive element that reconstructs said first spatially modulated light beam to create a reference beam which has a wavelength that is unique to said spatial address of said first spatially modulated light beam;

a diffraction element that receives said reference beam and creates a second spatially modulated light beam which has a spatial address that corresponds to the data bit string; and, a photodetector which detects said second spatially modulated light beam.

2. The system as recited in claim 1, wherein said refractive element is a volume hologram.

3. The system as recited in claim 2, wherein said refractive element includes a hologram that emits said reference beam at an angle unique to said spatial address, and a filter that absorbs said wavelengths except said wavelength that is unique to said spatial address.

4. The system as recited in claim 1, wherein said light source is a plurality of light emitters.

5. The system as recited in claim 1, further comprising a first buffer that stores the data bits of the data bit string and is coupled to said light source.

6. The system as recited in claim 5, further comprising a second buffer that is coupled to said photodetector and stores the data bits of the data bit string.

7. The system as recited in claim 1, wherein said refractive element creates a reference beam with a first wavelength from a first spatial address of said first spatially modulated light beam, and creates a reference beam with a second wavelength from a second spatial address of said first spatially modulated light beam.

8. The system as recited in claim 1, further comprising an optical waveguide that couples said refractive element with said diffraction element.

9. A method for compressing a data bit string which has a plurality of data bits, comprising the steps of:

a) generating a first spatially modulated light beam which has a spatial address that corresponds to the data bits of the data bit string, said first spatially modulated light beam having a plurality of wavelengths;

b) reconstructing said first spatially modulated light beam to create a reference beam which has a wavelength that is unique to said spatial address of said first spatially modulated light beam;

c) transmitting said reference beam;

d) receiving said reference beam;

e) creating a second spatially modulated light beam from said reference beam, wherein said second spatially modulated light beam has a spatial address that corresponds to the data bits of the data bit string; and, f) detecting said second spatially modulated light beam.

* * * * *

UNITED STATES PATENT AND TRADEMARK OFFICE
CERTIFICATE OF CORRECTION

PATENT NO. : 5,479,164
DATED : December 26, 1995
INVENTOR(S) : Yorks et al.

It is certified that error appears in the above-identified patent and that said Letters Patent is hereby corrected as shown below:

In column 3 at line 46 between "unique" and "ranging" insert --wavelength--

Signed and Sealed this

Ninth Day of April, 1996

Attest:

BRUCE LEHMAN

Attesting Officer

Commissioner of Patents and Trademarks